(12) United States Patent
Martinelli et al.

(10) Patent No.: US 9,297,960 B2
(45) Date of Patent: Mar. 29, 2016

(54) MULTIPORT TUNABLE OPTICAL FILTERS

(71) Applicant: II-VI Incorporated, Saxonburg, PA (US)

(72) Inventors: Massimo Martinelli, Santa Clara, CA (US); Mark H. Garrett, Morgan Hill, CA (US); Ruipeng Sun, Pleasanton, CA (US); Mikhail I. Rudenko, Menlo Park, CA (US)

(73) Assignee: II-VI INCORPORATED, Saxonburg, PA (US)

( * ) Notice: Subject to any disclaimer, the term of this patent is extended or adjusted under 35 U.S.C. 154(b) by 0 days.

(21) Appl. No.: 14/746,989

(22) Filed: Jun. 23, 2015

(65) Prior Publication Data

US 2015/0309259 A1 Oct. 29, 2015

Related U.S. Application Data

(62) Division of application No. 13/662,797, filed on Oct. 29, 2012, now Pat. No. 9,097,580.

(51) Int. Cl.
*G01J 3/46* (2006.01)
*G02B 5/12* (2006.01)
(Continued)

(52) U.S. Cl.
CPC .............. *G02B 6/29395* (2013.01); *G01J 3/28* (2013.01); *G02B 6/2938* (2013.01);
(Continued)

(58) Field of Classification Search
CPC .......... H04B 10/675; H04J 14/02; G01J 3/28; G02B 6/29395; G02B 6/29361; G02B 6/3518; G02B 6/3546; G02B 6/26; G02B 6/359; G02B 6/3556; G02B 6/3512; G02B 6/23911–6/13; G02B 6/356; G02B 6/3548; G02B 6/29034
USPC ............... 398/43, 48, 68, 79, 82, 84, 87, 212; 385/24, 37; 356/402
See application file for complete search history.

(56) References Cited

U.S. PATENT DOCUMENTS 4,923,270 A   5/1990   Carter
6,891,676 B2  5/2005   Ford et al.
(Continued)

FOREIGN PATENT DOCUMENTS

CN    101384933 A    3/2009
WO    WO 2007/078415 A2    7/2007

OTHER PUBLICATIONS

Patent Cooperation Treaty, International Search Report, International Patent Application No. PCT/US2011/045424, mailed Dec. 5, 2011, 2 Pages.
(Continued)

*Primary Examiner* — Tarifur Chowdhury
*Assistant Examiner* — Sunghee Y Gray
(74) *Attorney, Agent, or Firm* — Wendy W. Koba (57) ABSTRACT

A tunable multiport optical filter includes various types of arrays of optical ports. The tunable filter also includes a light dispersion element (e.g., a grating) and a reflective beam steering element (e.g., a tilting mirror). An optical signal exits an optical (input) port, is dispersed by the light dispersion element, reflects off the reflective beam steering element back to the light dispersion element, and on to another optical (output) port. The reflective beam steering element can be steered such that a wavelength portion of the dispersed optical signal can be coupled to the optical output port. For example, the input optical signal may be a wavelength division multiplexed signal carrying multiple channels on different wavelengths, and the tunable multiport optical filter directs one of the channels to the output optical port. Additionally, the tunable filter may be incorporated into a device acting as a wavelength reference.

7 Claims, 6 Drawing Sheets

(51) Int. Cl.
*G02B 5/28* (2006.01)
*G02B 27/10* (2006.01)
*H04B 10/06* (2006.01)
*H04J 14/02* (2006.01)
*G02B 6/293* (2006.01)
*H04B 10/67* (2013.01)
*G01J 3/28* (2006.01)
*G02B 6/35* (2006.01)

(52) U.S. Cl.
CPC ....... *G02B 6/29311* (2013.01); *G02B 6/29361* (2013.01); *G02B 6/3512* (2013.01); *H04B 10/675* (2013.01); *H04J 14/02* (2013.01)

(56) References Cited

U.S. PATENT DOCUMENTS

| | | | |
|---|---|---|---|
| 7,016,098 B2 | 3/2006 | Giles et al. | |
| 7,362,930 B2 | 4/2008 | Davis et al. | |
| 7,440,648 B2 | 10/2008 | Oikawa et al. | |
| 7,720,329 B2 | 5/2010 | Presley et al. | |
| 2001/0038730 A1 | 11/2001 | Sorin et al. | |
| 2004/0156581 A1 | 8/2004 | Golub et al. | |
| 2006/0257091 A1 | 11/2006 | Tabuchi et al. | |
| 2009/0103861 A1 | 4/2009 | Presley et al. | |
| 2010/0150563 A1 | 6/2010 | Nakajima | |
| 2012/0019810 A1 | 1/2012 | Wu et al. | |
| 2012/0020617 A1 | 1/2012 | Wu | |
| 2012/0020620 A1 | 1/2012 | Wu et al. | |
| 2012/0163825 A1 | 6/2012 | Wu et al. | |

OTHER PUBLICATIONS

Patent Cooperation Treaty, International Search Report, International Patent Application No. PCT/US2011/059448, mailed Apr. 4, 2012, 2 Pages.

PRNewswire Press Release, "Oclaro Announces Industry's First 8-Port Flexible-Grid Optical Channel Monitor," Sep. 10, 2012, 2 pages, [online] [retrieved Nov. 13, 2012] Retrieved from the internet <http://finance.yahoo.com/news/oclaro-announces-industrys-first-8-120000721.html>.

MULTIPORT TUNABLE OPTICAL FILTERS

CROSS-REFERENCE TO RELATED APPLICATIONS)

This application is a divisional of U.S. application Ser. No. 13/662,797 filed on Oct. 29, 2012, which is related to U.S. application Ser. No. 12/804,627 filed on Jul. 26, 2010, U.S. application Ser. No. 12/927,066 filed on Nov. 5, 2010, and U.S. application Ser. No. 13/226,275 filed on Sep. 6, 2011. The subject matter of all of the foregoing are incorporated herein by reference in their entirety.

BACKGROUND OF THE INVENTION

1. Field of the Invention

This invention relates generally to multiport tunable optical filters, for example as may be used for optical channel monitoring.

2. Description of the Related Art

Optical devices that can be tuned to select one or more wavelengths from a wider wavelength spectrum are known as tunable optical filters. They are used in a variety of optical systems, e.g., wavelength division multiplexed (WDM) systems. In WDM systems that operate typically over wavelength bands of tens of nanometers, tunable optical filters are used for optical performance monitoring (OPM) to ensure that signal power, signal wavelength, and/or optical signal to noise ratios (OSNR) are within specified limits. Other applications for tunable optical filters include optical noise filtering, noise suppression, the actual wavelength division demultiplexing function, and optical routing.

Dense wavelength division multiplexed (DWDM) systems have many wavelength channels operating across a wide optical spectrum. Additionally, many tunable optical filters are limited in terms of how their fiber input ports and fiber output ports are configured and the number of those ports. For example, a large linear array of ports may increase optical aberrations as the ports move away from the optical axis of the system, thus limiting the size of the array. Additionally, adding ports in this manner increases the form factor (e.g., size) of the device.

Additionally, with the introduction of DWDM systems operating on a flexible grid, a channel monitoring device may be required to report the power in a given frequency range, identified by a start and a stop frequency. Additionally, the system may be required to be able to locate these frequencies with an accuracy of 1 GHz. This is not readily done through calibration, as small changes in the optical path over the lifetime of the device can easily account for shifts that easily exceed 1 GHz. Moreover, the accuracy of 1 GHz is difficult to achieve even with a bench-top instrument.

SUMMARY OF THE INVENTION

In at least one embodiment, a tunable multiport optical filter includes a linear array of optical input ports extending along an x-direction and an optical output port. The optical input ports are positioned on a regular grid in the x-direction, where the regular grid is characterized by a pitch. For example, adjacent optical input ports may be separated by N×pitch, where N is an integer (most often 1). The optical output port is positioned collinearly with the optical input ports but is off the regular grid. For example, the optical output port may be separated from the nearest optical input ports by (N+0.5)×pitch. The tunable multipart optical filter also includes a light dispersion element (e.g., a grating) and a reflective beam steering element (e.g., a tilting mirror). An optical signal exits an optical input port, is dispersed in the y-direction (i.e., a direction different from the x-direction) by the light dispersion element, reflects off the reflective beam steering element back to the light dispersion element, and on to the optical output port. The reflective beam steering element can be steered such that any wavelength portion of the dispersed optical signal from any optical input port can be coupled to the optical output port. For example, the input optical signal may be a wavelength division multiplexed signal carrying multiple channels centered on different wavelengths, and the tunable multipart optical filter directs the channels to the output optical port.

In another aspect, a tunable multipart optical filter includes a two-dimensional array of optical ports, which includes optical input ports and their corresponding optical output ports. The two-dimensional array extends along both an x-direction and a y-direction that is not parallel to the x-direction. The tunable multipart optical filter also includes a light dispersion element and a reflective beam steering element that operates similarly as described above. That is, the light dispersion element disperses the optical signals along the y-direction, and the reflective beam steering element can be steered to couple a desired wavelength portion of the dispersed optical signal to the corresponding optical output port. The two-dimensional array is arranged to reduce coupling into other optical ports.

In another aspect, an optical channel monitoring (OCM) device uses tunable filters for example as described above. The OCM device is self-calibrating in that a reference spectrum is used to calibrate the tunable filter. In one approach, the reference spectrum is generated by an independent source, for example a broadband LED source coupled to a wavelength filter. In another approach, part of the incoming signal is tapped to produce the reference spectrum, for example by passing the tapped portion through an etalon filter. In certain embodiments, the reference spectrum has well-defined reference points (e.g., peak wavelengths) located outside the operating wavelength range for data transmission. In other embodiments, the reference spectrum is well-defined within the operating wavelength range.

Other aspects of the disclosure include methods and systems corresponding to the devices described above.

BRIEF DESCRIPTION OF THE DRAWINGS

The invention has other advantages and features which will be more readily apparent from the following detailed description of the invention and the appended claims, when taken in conjunction with the accompanying drawings, in which:

For clarity, identical reference numbers have been used, where applicable, to designate identical elements that are common between figures. It is contemplated that features of one embodiment may be incorporated in other embodiments without further recitation. The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION OF THE PREFERRED EMBODIMENTS

Figure 1:
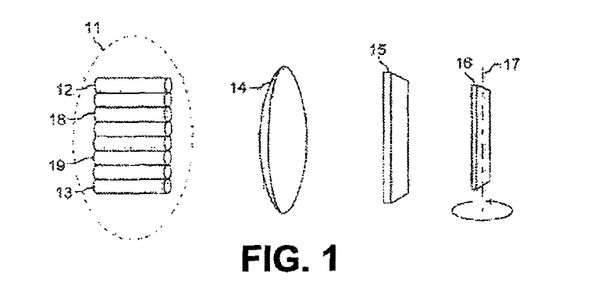
FIG. 1 is a perspective view showing a first embodiment of a tunable multiport optical filter.

FIG. 1 shows a first embodiment of a tunable multiport optical filter with an array of input and optical fibers shown at 11, and with collimating lens 14, dispersive element 15, and tuning mirror 16. The tuning mirror rotates around axis 17. It should be understood that this figure (and subsequent figures) is not drawn to scale. Optical elements are located and spaced according to their functions and properties as known in the art. The description herein uses x- and y-axial notations for directions around the z-axis, which is the direction of light propagation through the device. In the following examples, the x- and y-axes are orthogonal, but this is not required. The y-axis could be at angles other than 90 degrees relative to the x-axis. Reference herein to the x-plane or the y-plane will be understood to mean the x-z or y-z planes. Reference in the figures to the x-axis cross section or the y-axis cross section is intended to mean a view of the x-z plane or the y-z plane respectively.

The embodiments shown are described in the context of optical performance monitoring ("OPM") applications. However, it should be understood that the basic devices described herein are also useful as wavelength selective devices for routing selected WDM channels, as well as for other applications.

Figure 2:
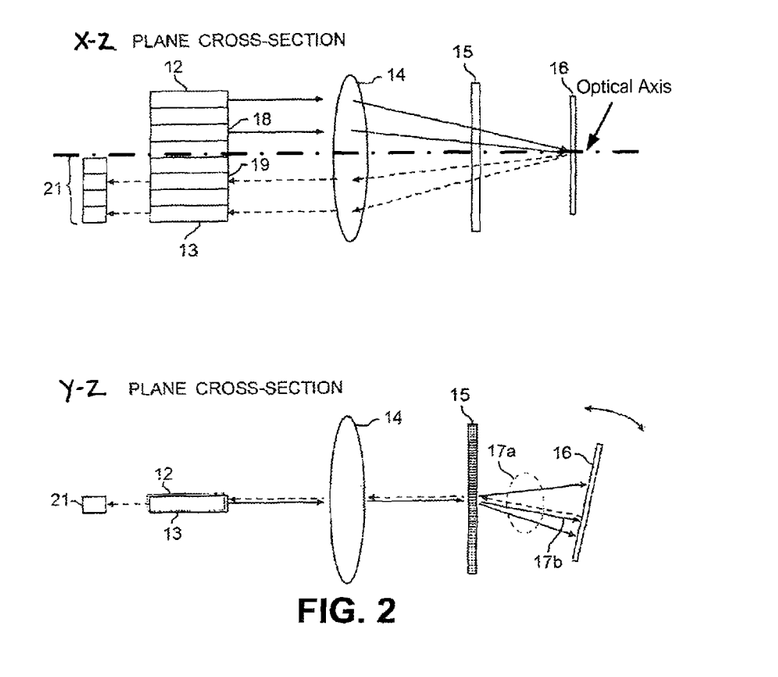
FIG. 2 are diagrams illustrating the operation of the tunable multiport optical filter of FIG. 1, showing ray diagrams for x- and y-cross sections of the device.

The specific optics as represented by ray optics, for the embodiment of FIG. 1, are illustrated in FIG. 2. The input fiber array 11 is composed by 8 fibers which are tightly aligned in parallel, i.e., the optical fibers have minimal spacing and are aligned with the centers of the optical fibers on a common axis, as shown the x-axis. The signal beam to be monitored, typically a tapped portion of the signal from one channel of the network, is coupled to input fiber 12. It passes through collimating lens 14 to collimate the Gaussian input beam to collimated light with suitable diameter. The collimated beam is incident onto dispersion element 15. In the x-axis cross section (top portion of FIG. 2) the beam is not dispersed. In the y-axis cross section (bottom portion of FIG. 2) the light beam from dispersion element 15 is dispersed into the wavelength components of the signal beam. The wavelength components 17a are angularly dispersed from the dispersion element in different directions depending on the wavelength of the beam. Tuning mirror 16 is positioned as shown to intersect the dispersed beam, and is rotatable about the x-axis and optionally also the y-axis. The latter rotation allows control and maximization of the output coupling.

The optical fibers are shown only schematically in the figures. Typically they will be standard single mode fibers with a cladding diameter of 125 microns and a core diameter of 10 microns or less. In the portion of the array shown, i.e., the portion addressed by the wavelength selection elements, the optical fibers are stripped of the usual polymer coating. This allows greater precision in the array, producing, in many cases, a predictable spacing between cores of the fibers. Recognizing that a variety of options in the format of the array may be desirable, as will be discussed in greater detail below, optical fibers with sizes other than the conventional 125 microns may be useful. For example, cladding diameters of 50, 62.5, 250, may be used to advantage to vary the overall aperture (size) of the array. It is expected that small aperture arrays may be most cost effective. Optical waveguide array could also be used to implement the same function.

Mirror 16 is rotatable about the x-axis into one of many positions. In the example shown in FIG. 2, only one of the beam components (wavelength channels), in this case components represented by arrow 17b, is normal to the mirror 16. That beam component is reflected back along a path represented by the dashed line. Other beam components, like the two shown in the y-axis cross section of FIG. 2, will "walk-off" the mirror 16. The selected beam component, 17b, is dispersed by element 15 by the same angle as before and propagates to output fiber 13. The intensity of beam component 17b is measured by photodiode 21, coupled as shown to the output fiber 13. Input optical fiber 12 is shown in this view just to orient the viewer to the fact that the optical fibers in the array are stacked in the y-direction.

When mirror 16 is rotated about the x-axis, another beam component (wavelength channel) will be normal to the mirror 16 and will be selectively reflected back through output fiber 13 and its properties measured. In this manner, the wavelength spectrum of the input beam to optical fiber 12 may be scanned and the properties of all of its beam components can be measured.

Thus the device achieves wavelength selection and provides an optical filter. The wavelength of the filter is tuned by the rotational orientation of mirror 16.

It should be noted that a similar result can be obtained if the axis of the dispersive element is rotated by 90 degrees and the mirror is tilted in the same axis that the beam is dispersed. In this configuration the light beam from the grating is dispersed into the wavelength components of the signal beam along the same axis of the fiber array, and there is some likelihood that the spectra from a fiber port will overlap with an adjacent or non-adjacent fiber port. The wavelength components which are diffracted from the dispersion element can be distinguished by increasing the separation of the fiber ports, although this will require a large optical aperture. To obtain satisfactory performance fiber port separation would be increased to three or more times larger than the separation required when the axis of the dispersive element is orthogonal to the fiber array.

It should be understood that a function of the rotating mirror 16 is to select a wavelength component of the incident beam and return it to a fixed position, in the case of the arrangement of FIG. 2, to output optical fiber 13/detector 21. An equivalent result may be achieved using a refractive beam steering element, and tilting or translating the refractive element to select a given wavelength and steer it to a fixed output/detector. A simple implementation of this is a lens or a flat or wedged transparent plate. The output/detector is this case is located on a side of the plate opposite to the input optical fiber. In this description, reference to a mirror or to a beam steering element should be construed as referring to and including equivalent structures such as those just mentioned.

It should be recognized that the optical paths in the x-axis cross section of FIG. 2 are unchanged by the tilt of mirror 16 in the y-z plane. This is due to the fact that lens 14 focuses all input beams on the axis of rotation of the mirror. The reflecting surface along the tilt axis remains essentially fixed when the mirror is tilted.

The orientation of the mirror may be changed by an actuator or several actuators. The mirror may comprise a micro electro-mechanical system (MEMS), or comprise a discrete mirror driven by motors or any other types or actuators. The tilt of the mirror may be changed in one axis, or more than one axis.

Another WDM channel may be input as an input beam to optical fiber 18. The output of the beam components from this channel are directed through output optical fiber 19 and measured by the associated photodetector as shown in the top portion of FIG. 2.

It should be appreciated by those skilled in the art that, while the array of input optical fibers, e.g., 12 and 18, and the array of output fibers 13 and 19 are shown closely packed and precisely aligned, the device input optical fibers and the device output optical fibers may have any length and be routed in any suitable fashion to other components/couplers in the system. For example, the photodetectors 21 are shown as an array of elements receiving light beams directly from the closely packed array of output optical fibers. However, the optical fiber 13 may route an optical signal to a photodiode non-aligned with respect to the output array of optical fibers.

The detection device may take any of a variety of forms, and measure a variety of optical beam properties. The arrangement shown is simple and useful for illustration. If the input beams are suitably time division multiplexed, a single detection device may be used. Alternatively a single spectrum analyzer may be used as the detection device.

In this description the optical elements are shown as separate elements. These represent functional elements. The physical elements providing these functions may, in some cases, be combined as a single module. For example, a grating may have a reflective surface or an attached or integral lens.

Additionally, in some embodiments, the mirror 16 may be rotated in a direction orthogonal to the axis of rotation shown in FIG. 1 as further described in U.S. patent application Ser. No. 12/927,066.

In the embodiments of FIGS. 1 and 2, the device is shown with an 8-fiber array, and can produce 4 signal paths from one input port to a corresponding output port (input port 12 to output port 13, input port 18 to output port 19, etc.). All of the signal paths are tuned simultaneously by rotating mirror 16. In this array, all of the optical fibers are aligned in a single plane. The number of fibers may vary but typically will be an even number so that the fibers can be paired to produce signal paths, with one fiber acting as the input port and the other fiber in the pair acting as the output port. Note that other pairings of the fibers may be possible within the same device. For example, in FIGS. 1 and 2, the input port 12 may be coupled to output port 19 by rotating the mirror 16 around the y-axis.

In embodiments where there is only one output port, only one input port at a time can be measured. Thus the channel reporting can only be updated every N×$t_s$ seconds, where N is the number of input ports and $t_s$ is the port scan time (typically in the hundreds of milliseconds). Increasing the number of input ports thus increases the time between updates. While FIG. 2 only shows two input and two output beams, it may be configured to receive four input beams and four output beams to the four photodetectors 21 (which will be referred to as a 4×4 configuration). For applications requiring faster reporting updates, the 4×4 configuration may be used. Here each input port is routed to a dedicated output port. Since the input and output ports are placed symmetrically with respect to the optical axis, all outputs are illuminated simultaneously, thus allowing the scanning of each input port to occur in parallel. The 4×4 configuration does not require any modification to the optics, only the photodetector for each output beam and the electronics for the parallel processing of the data. Since the filter is tuned to the same wavelength on all ports, this device can also be used to dwell or scan over the frequency width of a single wavelength so that the power of the corresponding channel can be continuously monitored on all ports simultaneously.

In a standard configuration of the fiber array, the fibers are laid out with a constant pitch. Pitch is the distance between the centers of the cores of adjacent fibers. Fibers on one side of the collimating lens (e.g., lens 14) optical axis (indicated with a dash-dot line) can be used as either input or output only. This is the case as input ports on either side of the optical axis may receive light from another port, thus compromising the device "directivity", i.e. the multiport device property for which light from one input port does not come out from another input port. Thus an 8-fiber array (e.g., as seen in FIG. 2) can be used either for a 4×1 device, or as a 4×4 device. For the former configuration only five of the eight fibers would be utilized, four as input ports and one as an output port.

Figure 3:
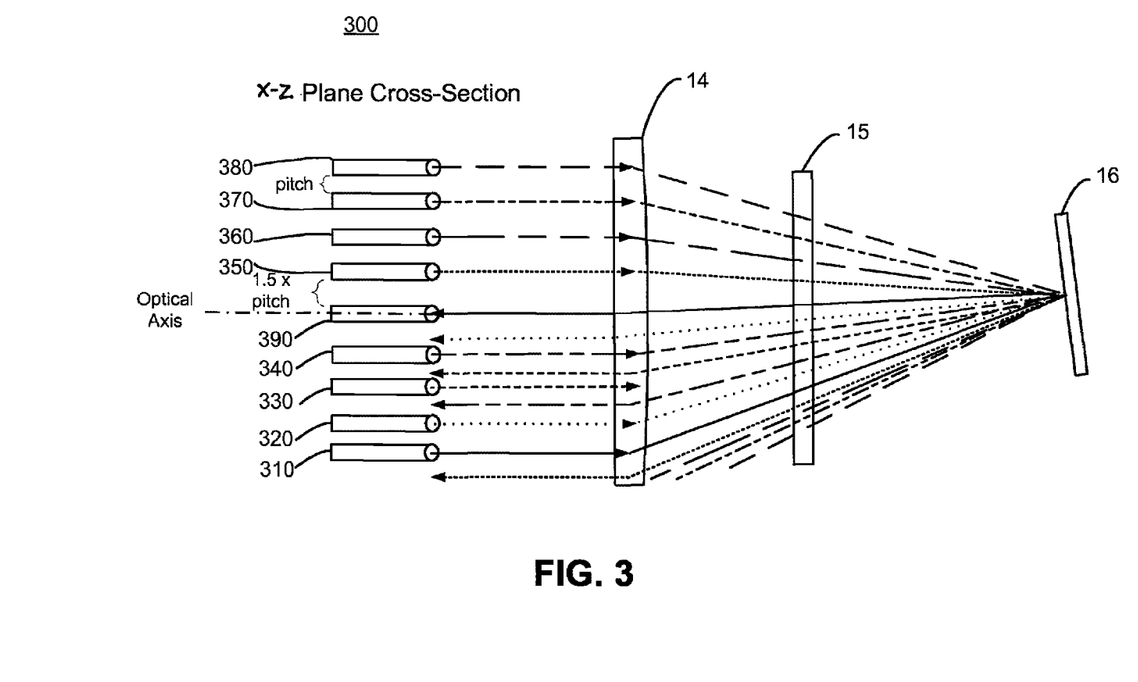
FIG. 3 is a schematic illustration of the operation of an example tunable multiport optical filter that may be configured for 8.times.1 operation.

FIG. 3 is a schematic illustration of the operation of an example tunable multiport optical filter 300 that may be configured for 8×1 operation. FIG. 3 shows a linear array of optical fiber input ports 310, 320, 330, 340, 350, 360, 370, and 380, and a fiber output port 390. The input ports are located on a regular grid in the x-direction. The regular grid is characterized by a pitch. Thus, adjacent input ports are spaced by an integral number of pitches in the x-direction, although it could be more than 1×pitch. For example, the spacing from port 380 to 370 is 1×pitch, but the spacing from port 350 to 340 is 3×pitch. The output port 390 is collinear with the input ports but is positioned off of the grid. In this example, it is at 1.5×the pitch from any adjacent port. For example, the diameter of a typical fiber is 125 µm, and the corresponding pitch is typically 127 µm. Thus, between the output port 390 and any adjacent port the distance would be 190.5 µm (1.5×127 µm), whereas the distance between input ports is N×127 µm where N is an integer.

The spacing of the optical ports is such that when a single input port is selected to be monitored via output port 390, any signal from a non-selected input port is reflected in a manner such that there is negligible coupling with the output port 390 or any of the other input ports. For example, in FIG. 3, the tunable multiport optical filter is configured to monitor an optical signal from input port 310. The filter 300 adjusts the angle of the mirror 16 such that the optical signal from input port 310 couples to output port 390. Due to the geometry of the system, and in particular, the spacing between the ports, when monitoring a particular port, any optical signals from non-monitored ports are reflected by the mirror 16 in a manner that results in little to no coupling or cross talk to other ports (e.g., reflected signals are incident in the space between the input ports or are reflected away from the port array).

In other embodiments, the output port 390 may be placed anywhere in the array, provided that it is not located on the regular grid defining the positions of the input ports. Preferably, its distance from an adjacent input port is (N+0.5)×pitch where N is an integer. Note that the device may also be used in a 4×4 configuration, for example where the top 4 optical ports are optical input ports which are coupled to the bottom 4 optical ports as optical output ports. In an alternate embodiment, the optical output port 390 may be placed at other locations, for example as an outer port (bottom or top) in the array of ports.

As discussed below, as the amount of aberration generally increases with the distance from the optical axis. The tunable multiport optical filter illustrated in FIG. 3 makes it possible to double the number of input ports without a significant increase of the distance between the fibers and the lens optical axis. Thus the optical performances of this 8-input port device is essentially the same as the 4-input port device shown in FIGS. 1 and 2.

As the number of ports is increased, the optical aberrations also increase due to the increased aperture requirement for the collimating lens 14. Standard aspheric lenses do correct for spherical aberration on the optical axis, however when working off axis, like in the case for a multipart tunable filter, coma aberration is also present. With reference to FIG. 3, the coma aberration increases linearly with the distance from the optical axis. Thus, adding more ports in the linear array results in a rapid degradation of the optical performance.

Systems with higher port count may be implemented using the two dimensions of the lens focal plane, i.e., arranging the fibers as a 2-dimensional array in the x-y plane. In this way a higher port count does not correspond to an increased distance of the fibers from the optical axis. For example, an 8×8 device can be implemented still using the same basic size of FIG. 3 if the fibers are laid out as in FIG. 4.

Figure 4:
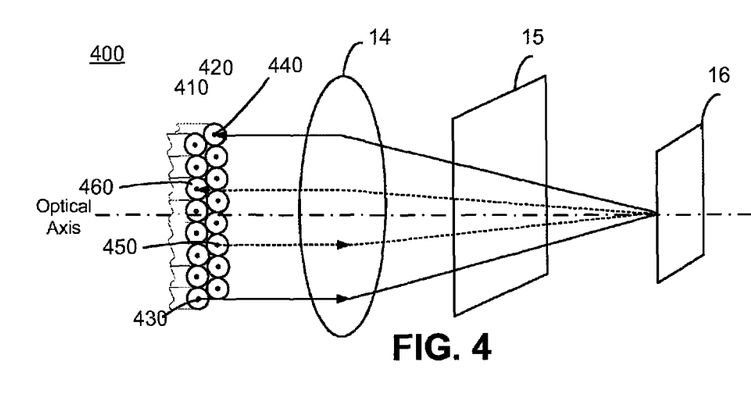
FIG. 4 is a perspective view of an example tunable multiport optical filter including two subarrays of ports.

FIG. 4 is a perspective view of an example tunable multiport optical filter 400 including an array of 16 fiber ports, which can be subdivided into two subarrays of 8 fiber ports each. The tunable filter 400 includes a first fiber port subarray 410 and a second fiber port subarray 420 that is shifted by 0.5×pitch with respect to the first port subarray 410. Because of the circular symmetry of lens 14, each fiber is imaged into the fiber placed symmetrically with respect to the optical axis. Thus, the optical signal leaving port 430 couples into the port 440 and the optical signal leaving port 450 couples into port 460.

Because of the presence of the grating, the image of each fiber will be dispersed based on the spectrum of wavelengths present in the light coming out from the fiber. Thus, in general the image is a line rather than a single point. Additionally, only a small fraction of the wavelength spectrum couples into an output fiber and the remaining portion should be rejected. For typical spectral width used in telecommunication systems (about 40 nm) a person skilled in the art can calculate that the length of the dispersed image is greater than 1 mm, i.e., much larger than the fiber core diameter (about 0.01 mm). Thus, if the two linear subarrays of fibers are not shifted with respect to each other, there is the possibility that some of the rejected light could couple into an adjacent fiber lying to the left (or right) of the selected output fiber, thus resulting in cross talk between ports.

The half-pitch shift of the first port subarray 410 with respect to the second port subarray 420 minimizes cross talk between ports. With this layout the rejected light will land in between two adjacent fibers, i.e. at about 60 micron from their cores, which ensures enough isolation to satisfy typical specifications (about 40 dB).

Figure 5:
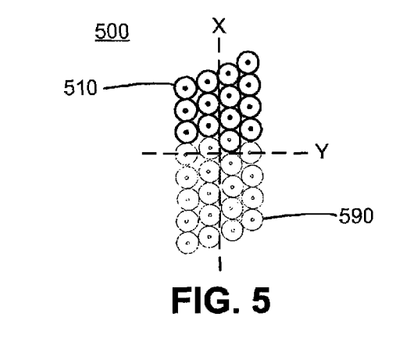
FIG. 5 illustrates an example multiple fiber port array, shown in the x-y plane.

In some embodiments, additional fiber port subarrays may be added that are shifted by a fraction of the pitch distance, thus extending to port counts greater than 8×8. In general the concept can be extended to N×N ports. For example, FIG. 5 illustrates an example port array 500 that has four subarrays, shown in the x-y plane. As in FIG. 4, the fiber port array in FIG. 5 is symmetric about the origin. That is, for every fiber located at position (x,y), there is a corresponding fiber located at position (−x,−y), and these two fibers form a signal path. For example, in FIG. 5, fiber 510 and 590 form one such pair. Array 500 may, for example, be used for a 16×16 device. In FIG. 5, each subarray of 8 fibers is shifted by 0.25×pitch so that these line images do not couple into unintended fibers.

For a fixed size, increasing the number of ports reduces the x offset between the fiber cores and thus increases the cross talk between ports. For instance, in the N=16 example shown in FIG. 5, the x offset is 0.25×pitch (as opposed to 0.5×pitch in FIG. 4). The isolation I between ports can be estimated using the formula (in dB)

$$I \approx 4.34[d/w_0]^2 \qquad (1)$$

where d is the x offset and $w_0$ is mode field radius of the fiber.

For example, assuming the N=16 configuration of FIG. 5 and typical values (d=127/4=31.75 μm, $w_0$ 5.2 μm) the calculated isolation is greater than 100 dB. The actual limitation is thus due to the coupling of the cladding modes into the core fundamental mode. If scattering centers such as micro-bending, air bubbles, etc., are minimized, the isolation can meet the typical requirements (about 40 dB), even for fiber separations as small as 20 μm. If the configuration of FIG. 5 is extended to contain 2m subarrays of 8 fibers each (m=1 in FIG. 4 and m=2 in FIG. 5), then this would correspond to a 8m×8m array with an x offset of 1/(2m)×pitch. This is only one configuration and others are also possible. For example, each subarray could contain 6, 10 or other numbers of fibers. The fibers could be arranged in semi-regular or even non-regular patterns. For example, in FIG. 5, subarrays 2 and 3 (the two closest to the x-axis) could be swapped.

Figure 6:
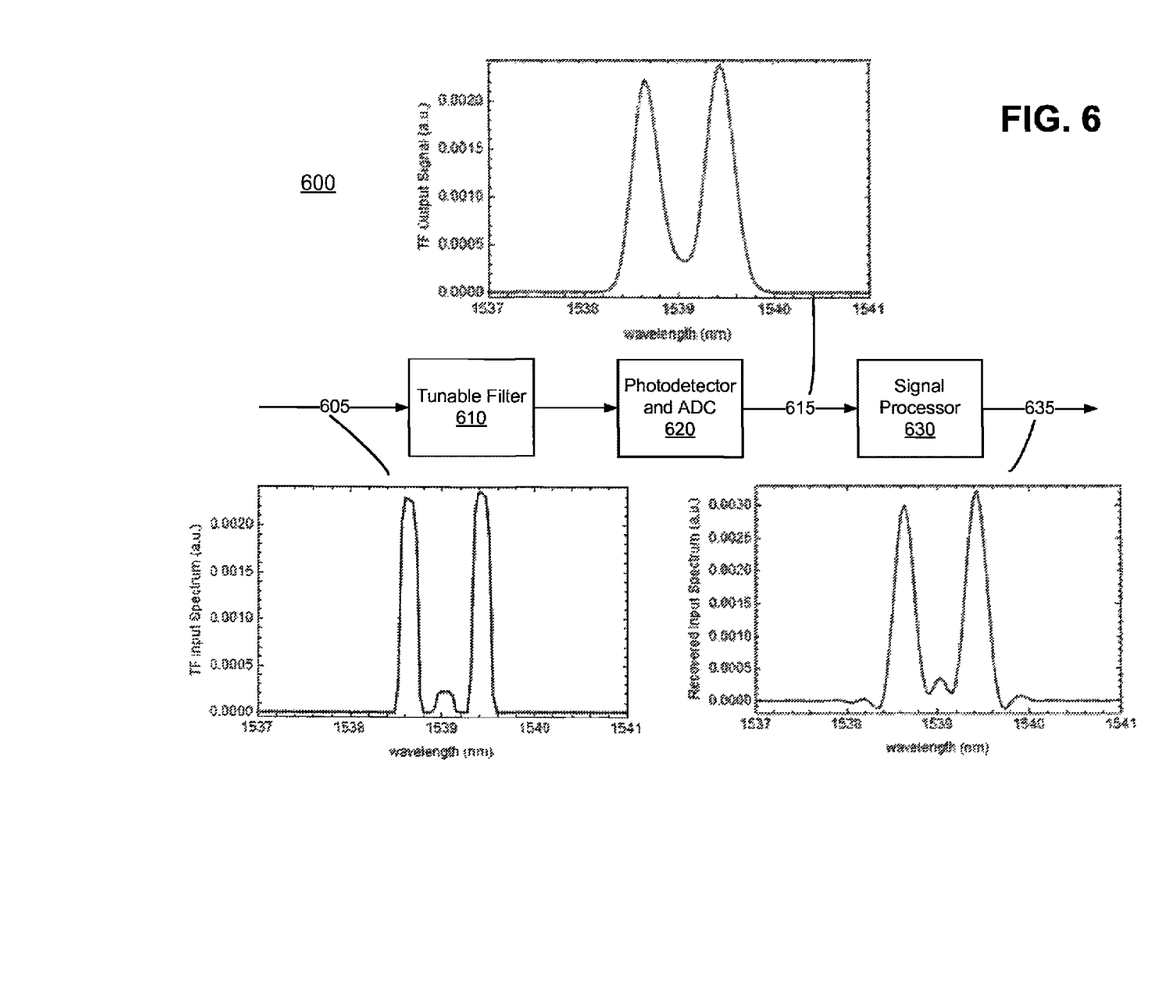
FIG. 6 is a block diagram of an example process to increase the resolution of a tunable multiport optical filter.

The extension to two dimensions can increase the number of ports without requiring a corresponding increase of device dimensions, thereby keeping the same basic design without compromising optical performance. With the increasing deployment of networks whose channels are more tightly spaced in wavelength, it is desirable to increase the resolution of the tunable filter. A Gaussian beam based analysis of the system in, e.g., FIG. 3 shows that the filter shape is Gaussian with a full width half maximum FWHM=0.831×λ/N, where N is the number of grating lines illuminated by the beam and λ is the light wavelength. Increasing the number of illuminated grating lines would then decrease the width of the filter response and thus increase its resolution. In some embodiments, N may be increased by using a larger optical beam. However, this may increase the size of the grating and thus results in larger device dimensions. Additionally, in some embodiments, the number of illuminated grating lines can also be increased by using a grating with higher line densities. For example, a high diffraction efficiency, polarization independent transmission grating with 1200 lines per millimeter or more may be used. The use of the high density grating may result in increased filter resolution without significant change of the device dimensions. Moreover, in some embodiments, signal processing (e.g., deconvolution) may be used to enhance the resolution of the filter. FIG. 6 is a block diagram of an example process 600 to increase the resolution of a tunable multipart optical filter.

In FIG. 6, a tunable filter 610, receives an input signal 605. The tunable filter 610 may be, for example, any of the tunable filters discussed with reference to FIGS. 1-5. FIG. 6 shows an example spectrum of the input signal 605 (measured by a bench top optical spectrum analyzer). This spectrum is composed of three channels spaced apart by 0.4 nm (50 GHz) from one another. The power of the middle channel is one tenth of the powers of the two side channels. The tunable filter 610 outputs an optical signal, which is detected and digitized by the photodetector and analog-to-digital converter 620. In some cases, such as the one represented by 615, due to the resolution of the tunable filter 610, the presence of a channel in between the two peaks is no longer obvious. The digital signal is then passed to signal processor 630. Signal processor 630 applies a deconvolution to the signal to increase the signal resolution resulting in the processed signal 635. The peak of the middle channel is now detectable, so that its presence, as well other parameters such as power and wavelength, can be accounted for.

With the introduction of DWDM systems operating on a flexible grid, a channel monitoring system, which comprises a tunable filter, may be desirable to report the power in a given frequency range, identified by a start and a stop frequency. One requirement may to be able to locate these frequencies with accuracy of 1 GHz. Embodiments discussed below make this possible using self-calibrating optical channel monitoring ("OCM") devices.

Figure 7:
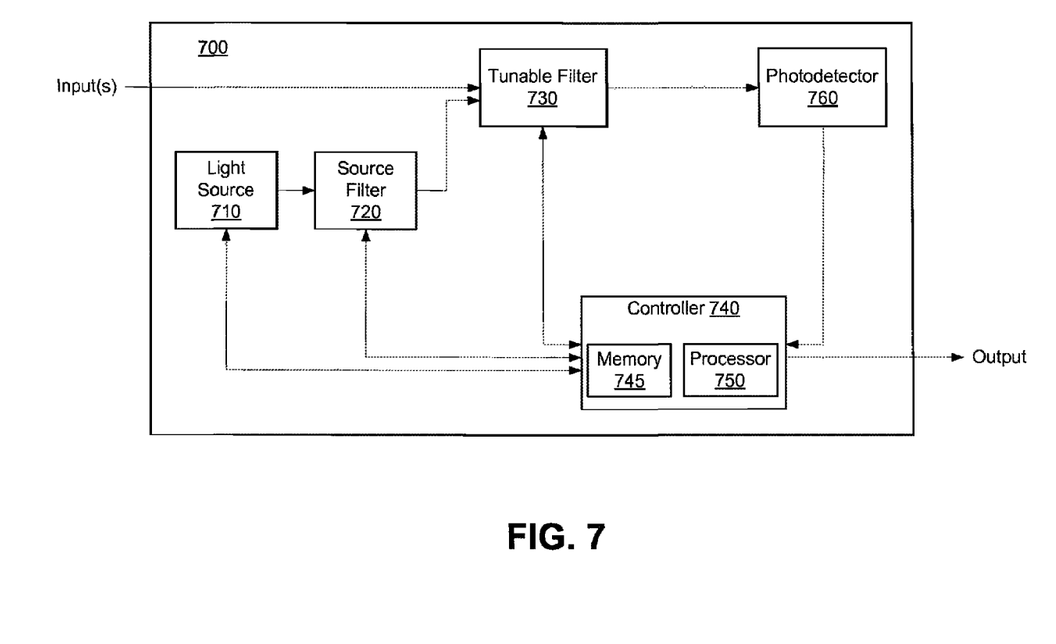
FIG. 7 is a block diagram of an example optical channel monitoring device configured to self-calibrate.

FIG. 7 is a block diagram of an example OCM device 700 configured to self-calibrate. The OCM system 700 includes a light source 710, a source filter 720, a tunable filter 730, a controller 740, and a photodetector 760. While only a single input and a single output (with corresponding photodetector 760) are shown, it should be understood that the invention is applicable to an OCM device with any number of optical input ports and any number of photodetectors 760. The light source 710 is a broad band source, for example, an LED or SLED. The light source 710 generates a source spectrum that is filtered by the source filter 720.

The source filter 720 includes at least two pass bands that are located just outside the wavelength range over which the tunable filter 730 is intended to operate. For example, if the tunable filter is used in a data transmission system and the operating wavelength range for the data transmission (i.e., for the input optical signal) is 1528.710 nm to 1563.86 nm, the source filter 720 may provide pass bands centered at 1522 nm and 1570 nm. The source filter 720 filters the source spectrum to produce a reference spectrum with peaks at the pass band locations. Additionally, in some embodiments, instead of being located on either side of the operating wavelength range, the pass bands may be located on the same side of the operating wavelength range, for example pass bands at 1570 nm and 1600 nm. Additionally, in some embodiments, the stability of these pass bands may be ensured using special packaging of the source filter 720 that incorporates a temperature controller (not shown). The light source 710 and source filter 720 together produce the reference spectrum, but the reference spectrum may be produced by other types of reference spectrum sources, such as precisely controlled tunable laser or one or more distributed-feedback (DFB) lasers.

The reference spectrum may be input to the tunable filter 730 either using an auxiliary input port or by using a directional coupler to one of the tunable filter ports. The tunable filter 730 may be, for example, any of the tunable filters discussed with reference to FIGS. 1-6.

The output of the tunable filter 730 may be monitored by the photodetector 760. While only a single photodetector is shown, in embodiments with multiple outputs, each output may have a dedicated photodetector 760. Moreover, in some embodiments, one or more output optical ports of the tunable filter 730 may be replaced with a corresponding photodetector. Moreover, in some embodiments the OCM device 700 may include one or more electronic amplifiers (not shown) that amplify the electronic output signal produced by the photodetector 760.

The controller 740 includes a memory 745 and a processor 750. The controller 740 is configured to execute instructions that calibrate the tunable filter 730 using the reference spectrum. The calibration may occur continuously, periodically, upon receipt of a calibration command, or some combination thereof. The controller 740 calibrates the tunable filter 730 using the reference spectrum. For example, memory 745 may contain a lookup table that maps wavelength (or frequency) to reflective beam steering element (e.g., mirror 16). During a calibration process, the tunable filter 730 may scan across a range of wavelengths until at least two peaks in the reference spectrum are detected. The controller 740 records the reflective beam steering element positions for those peaks in memory 745. A reflective beam steering element position for a reference wavelength (e.g., where a peak occurs in the reference spectrum) is known as a reference data point. The controller 740 interpolates reflective beam steering element positions and their corresponding wavelengths using algorithms stored in the memory 745 and the reference data points. The controller 740 may then update its lookup table with revised calibration data.

Additionally, in some embodiments, the resolution of the tunable filter 730 may be increased using signal processing techniques described above with reference to FIG. 6. For example, controller 740 may be configured to convert the electronic output of the photodetector 760 into a digital signal and perform signal processing techniques on the digital signal. This embodiment may be useful in cases where the reference wavelengths are closely spaced.

Memory 745 also stores programmable parameters for monitoring optical signals received by OCM device 170 through one or more inputs, and the optical power of different optical channels as measured based on signals from photodetectors 760. Optical channel monitoring is further described in U.S. patent application Ser. No. 13/226,275.

In alternate embodiments, the source filter 720 is an etalon filter and generates a reference spectrum that includes one or more peaks within the operating wavelength range. In this case, the output of source filter 720 is coupled to the tunable filter 730 via an auxiliary port (not shown). In some embodiments, the source filter 720 may be configured such that the peaks of the reference spectrum correspond to locations on an International Telecommunication Union ("ITU") grid.

Figure 8:
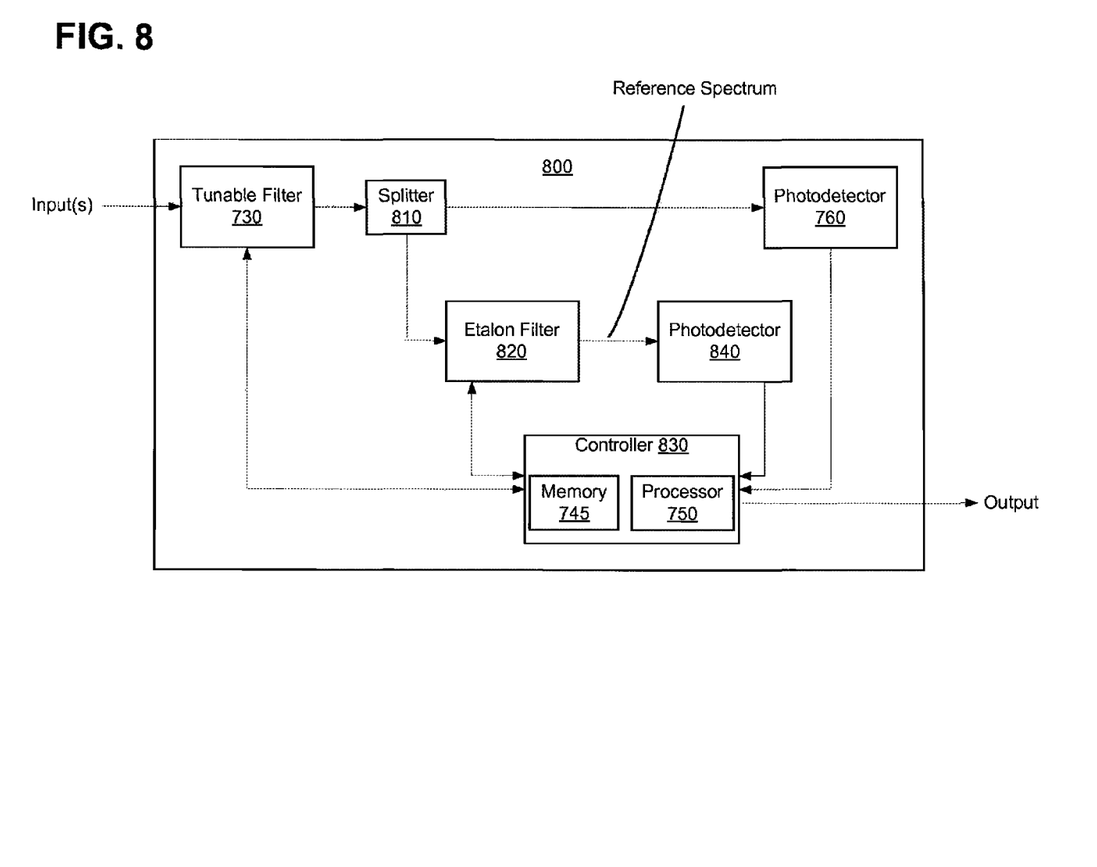
FIG. 8 is a block diagram of an example optical channel monitoring device configured to self-calibrate using an optical signal from an output port of a tunable filter to generate a reference spectrum.

Note, that FIG. 7 includes a light source 710. An alternative embodiment uses the optical signals from an output port of a tunable filter as a light source. FIG. 8 is a block diagram of an example OCM device 800 configured to self-calibrate using an optical signal an output port of a tunable filter to generate a reference spectrum. The OCM device 800 includes a tunable filter 730, photodetector 760, a splitter 810, an etalon filter 820, a controller 830, and photodetector 840. While only a single input and a single output (and corresponding photodetector 760) are shown, it should be understood that the invention is applicable to an OCM device with any number of optical input ports and any number of photodetectors 760.

The output of the tunable filter 730 is split via splitter 810. One part of the split output is provided to a photodetector 760 for monitoring by the OCM device 800. The other part of the split output is provided to the etalon filter 820 which treats it as a light source to generate a reference spectrum. At any given time, the input spectrum to the etalon filter 820 contains only a narrow range of wavelengths (e.g., those passing through the tunable filter 730), thus there is only one corresponding peak at the output of the etalon filter 820. Additionally, because of the periodicity of the etalon filter 820, there is the danger of mistaking a channel n for n−1, or vice versa. This may be avoided by ensuring that the tunable filter wavelength is stable within +/−25 GHz. To ensure that the channel light is not rejected by the etalon filter 820, the peaks of the etalon transmission spectrum may be aligned to the ITU grid, as shown in FIG. 8. In this embodiment, the etalon filter 820 may have a 50 GHz or a 100 GHz free spectral range. The photodetector 840 detects the reference spectrum and provides an electronic form of the reference spectrum to the controller 830. In other embodiments, the etalon transmission spectrum may be aligned to some other frequency locations.

The controller 830 is configured to execute instructions that calibrate the tunable filter 730 using the reference spectrum. The calibration may occur continuously, periodically, upon receipt of a calibration command, or some combination thereof. Because the reference spectrum generates peaks at known wavelengths the controller 830 is able to calibrate the tunable filter 730. For example, memory 745 may contain a lookup table that maps wavelength (or frequency) to a reflective beam steering element's position (e.g., mirror 16). During a calibration process, the tunable filter 730 may scan across a range of wavelengths until at least one peak is present in the reference spectrum that is detected via a photodetector 760. The controller 830 records the reflective beam steering element positions in memory 740 (e.g., determines reference data point for each detected peak in the reference spectrum). The controller 830 calculates the reflective beam steering element positions and their corresponding wavelengths using algorithms stored in the memory 740 and the reference data points. Using a larger number of reference data points in the calibration process results in a more accurate calibration data. The controller 830 may then update its lookup table with revised calibration data. It is also worth noting that, considering that the OCM device 800 reports the wavelengths of the channels that are present, and that the reference wavelengths are generated by those channels, the wavelength reporting accuracy is not affected by the number of channels that are present.

Although the detailed description contains many specifics, these should not be construed as limiting the scope of the disclosure but merely as illustrating different examples and aspects of the disclosure. It should be appreciated that the scope of the disclosure includes other embodiments not discussed in detail above. For example, in some embodiments FIG. 7 may be modified such that the Source Filter 720 may be connected to the Tunable Filter 730 output through a splitter. Persons skilled in the relevant art can appreciate that many modifications and variations are possible in light of the above disclosure.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

Each controller (e.g., controller 740 and controller 830) may be implemented in computer hardware, firmware, software, and/or combinations thereof. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Any of the foregoing can be supplemented by, or incorporated in, ASICs (application-specific integrated circuits) and other forms of hardware. Some of the methods performed by the computer may be implemented using computer-readable instructions that can be stored on a tangible non-transitory computer-readable medium, such as a semiconductor memory.

What is claimed is:

1. A tunable multiport optical filter comprising:
   a two-dimensional array of optical ports, including both optical input ports and corresponding optical output ports, the two-dimensional array extending along both an x-direction and a y-direction that is not parallel to the x-direction;
   a light dispersion element positioned to receive optical signals from the optical input ports and to disperse the optical signals along the y-direction, each received optical signal dispersed into a plurality of separate wavelength components; and
   a reflective beam steering element positioned to receive the multiple pluralities of separate wavelengths components dispersed by the light dispersion element and to reflect the dispersed optical signal back to the light dispersion element, the reflective beam steering element controllable for redirecting any selected wavelength components of the dispersed optical signals through the light dispersion element to couple to the corresponding optical output ports without significant coupling to other optical ports.

2. The tunable multiport optical filter of claim 1, wherein the two-dimensional array of optical ports comprises at least two one-dimensional subarrays of optical ports, each of the two one-dimensional subarrays extending along the x-direction and characterized by a pitch, wherein the two one-dimensional subarrays are offset in the x-direction by a fraction of the pitch.

3. The tunable multiport optical filter of claim 2, wherein there are two one-dimensional subarrays and the two subarrays are offset in the x-direction by one-half of the pitch.

4. The tunable multiport optical filter of claim 2, wherein there are 2m one-dimensional subarrays with m being an integer≥1, and the subarrays are offset in the x-direction by (1/2m) times the pitch.

5. The tunable multiport optical filter of claim 1, wherein the two-dimensional array of optical ports is symmetric about an (x,y) origin, and optical ports location at (x,y) and (−x, −y) form pairs of an optical input port and a corresponding optical output port.

6. The tunable multiport optical filter of claim 1, wherein the optical signal is a wavelength-division multiplexed signal containing multiple channels at different wavelength components, and the reflective beam steering element is controllable for redirecting any selected channel of the dispersed optical signal through the light dispersion element for coupling to the optical output port.

7. The tunable multiport filter of claim 6, wherein the wavelength-division multiplexed signal complies with an ITU grid.

* * * * *